2,998,393
CATALYST

John Charles Stalley, John Norman Haresnape, and Roy Turner, all of Sunbury-on-Thames, England, assignors to The British Petroleum Company Limited, London, England, a British joint-stock corporation
No Drawing. Filed Mar. 12, 1957, Ser. No. 645,398
Claims priority, application Great Britain Mar. 20, 1956
2 Claims. (Cl. 252—465)

This invention relates to catalysts consisting of a carrier of alumina on which one or more active catalyst components are supported, hereinafter referred to for convenience as alumina-based catalysts.

It is known that surface area and average pore size are two of the factors affecting the activity of alumina-based catalysts. As commonly prepared on a commercial scale, the size of the pores of the alumina of such catalysts is largely concentrated at about 50 A. diameter but a higher average pore size may be desirable in certain reactions, for example the dehydrogenation of butane using a catalyst of chromium oxide supported on alumina, and methods have been proposed for the preparation of alumina having an average pore size of about 80 A. diameter. Examples of such methods are given by Blanchin, Compt. Rend. Paris, 1951, 233, page 1106 and Fricke et al., Z Naturforsh, 1947, 26, page 244.

The object of the present invention is to reduce the number of steps in the preparation of alumina-based catalysts of high average pore size.

According to the present invention, there is provided a method of forming alumina-based catalysts of relatively high average pore size of the order of 80 A. diameter and high surface area, which method comprises incorporating catalytic material in alumina hydrate simultaneously with its formation from aluminum amalgam by hydrolysis by treating aluminum amalgam at a temperature above 80° C. with an aqueous liquid medium containing, as the catalytic material, one or more active catalyst components or compounds capable of forming active catalyst components on calcination, whereby alumina hydrate is precipitated as bohmite in the presence of the catalytic material and it is simultaneously impregnated with the catalytic material, separating alumina hydrate impregnated with the catalytic material from the aqueous liquid medium, and calcining the impregnated alumina hydrate.

The invention is applicable to alumina-based catalysts generally and the active catalyst components may be for example metals or metal compounds, particularly oxides, from group VI or group VIII of the periodic table. Thus the components may be molybdenum oxide or cobalt oxide or both, and when both are present they may be in the form of the oxides as such or combined as cobalt molybdate.

The active catalyst components or compounds capable of forming them on calcination are preferably dissolved in the aqueous liquid medium.

The quantity of the component or compound in the aqueous liquid medium will depend on the tendency of the component or compound to come down with the alumina hydrate and on the quantity of component required in the finished catalyst. The optimum concentration in the aqueous liquid medium to produce a catalyst of given composition may be determined by experiment.

The treatment of the aluminum amalgam with the aqueous liquid medium should be carried out above 80° C. since at lower temperatures the alumina hydrate is precipitated partly as bayerite which gives a lower average pore size for the calcined alumina than does boehmite, which is precipitated above 80° C.

The impregnated alumina hydrate is preferably dried before calcination and the calcining temperature used should be below that at which the alumina is converted to the undesirable α-form. This may vary with the particular catalyst components present but may readily be determined by experiment for any given component or components. For cobalt and molybdenum containing catalysts temperatures of up to 550° C. have been found satisfactory.

The aluminum amalgam used may be prepared in any convenient manner, for example by treating aluminum with a mixture of dilute hydrochloric acid and mercury, or with mercuric chloride solution or by immersing aluminum free from its normal oxide film in mercury. During the treatment of the amalgam with the aqueous liquid medium the mercury is released, and can be recovered and re-used without substantial loss.

By the present invention alumina-based catalysts of relatively high average pore size of the order of 80 A. diameter and high surface area may be prepared. By precipitating the alumina hydrate in the presence of the other catalytic material or compounds capable of forming it, the number of treatment steps is reduced and the other catalytic material is more evenly and intimately composited with the alumina.

The invention is illustrated by the following example.

Example 29 g. of high purity aluminum, in the form of small pieces was immersed in 580 ml. of hydrochloric acid 0.1 N for three hours, after which period 29 g. of mercury was added to the mixture which was then shaken occasionally over a further period of one hour.

The hydrochloric acid and excess mercury were decanted from the aluminum amalgam which was then rinsed in three 200 ml. portions of distilled water.

29 g. of the amalgam was allowed to react for 16 hours at 95° C. with 290 ml. of an aqueous solution of ammonical cobalt molybdate, prepared as follows:

A solution of 7.4 g. cobalt nitrate in 6 ml. of water was mixed with a solution of 9.3 g. of ammonium molybdate in 20 ml. of water and 20 ml. of ammonia 880. The precipitate was dissolved by adding a further 10 ml. of ammonia and the solution diluted to 290 ml.

The impregnated alumina hydrate was filtered off, dried at 80° C. for 24 hours and then calcined at 550° C. for two hours. It had the following properties:

| | |
|---|---|
| Average pore diameter | A 72 |
| Cobalt content as CoO | percent w./w 2.7 |
| Molybdenum as $MoO_3$ | percent w./w 9.3 |
| Specific surface area | $m.^2/g$ 272 |

The average pore diameter and specific surface area were determined by low temperature nitrogen adsorption.

The foregoing treatment of aluminum with a mixture of dilute hydrochloric acid and mercury resulted in the conversion of a small part of the aluminum to the hydroxide but this was subsequently washed away leaving the bulk of the aluminum covered with a film of amalgam; this washed amalgam was then used in the reaction with water at 95° C. The formation of this trace of hydroxide in the amalgamation stage is not considered to be important since it does not reach the final product.

We claim:

1. A method of forming alumina-based cobalt-molybdate catalysts of relatively high average pore size of the order of 80 A. diameter and high surface area, which method comprising incorporating cobalt molybdate in alumina hydrate simultaneously with its formation from aluminum amalgam by hydrolysis, by treating aluminum amalgam at a temperature above 80° C. with an ammoniacal cobalt molybdate solution whereby alumina hydrate is precipitated as bohmite in the presence of cobalt molybdate and is simultaneously impregnated with cobalt molybdate; separating alumina hydrate impregnated with cobalt molybdate from the ammoniacal cobalt molybdate solution; and, calcining the separated impregnated alumina hydrate.

2. A method according to claim 1 in which the calcining is carried out at a temperature not higher than 550° C.

References Cited in the file of this patent

UNITED STATES PATENTS

| | | |
|---|---|---|
| Re. 22,196 | Heard | Oct. 6, 1942 |
| 2,274,633 | Pitzer | Mar. 3, 1942 |
| 2,393,288 | Byrns | Jan. 22, 1946 |
| 2,695,893 | Houdry | Nov. 30, 1954 |
| 2,696,474 | Heard | Dec. 7, 1954 |
| 2,746,842 | Block et al. | May 22, 1956 |
| 2,840,529 | Lefrancois | June 24, 1958 |